(No Model.)

5 Sheets—Sheet 1.

H. CARTER & W. RENNIE
DITCHING MACHINE.

No. 285,225. Patented Sept. 18, 1883.

Witnesses.
Levi Tomlinson
J. B. Fetherstonhaugh

Inventors.
Henry Carter
Wm Rennie
by Donald C. Ridout & Co.
Attorneys (No Model.) 5 Sheets—Sheet 2.

H. CARTER & W. RENNIE.
DITCHING MACHINE.

No. 285,225. Patented Sept. 18, 1883.

Witnesses.

Lewis Tomlinson

J. B. Fetherstonhaugh

Inventors

Henry Carter
Wm Rennie
by Donald C. Ridout & Co.
Attorneys (No Model.) H. CARTER & W. RENNIE. 5 Sheets—Sheet 3.
DITCHING MACHINE.
No. 285,225. Patented Sept. 18, 1883.
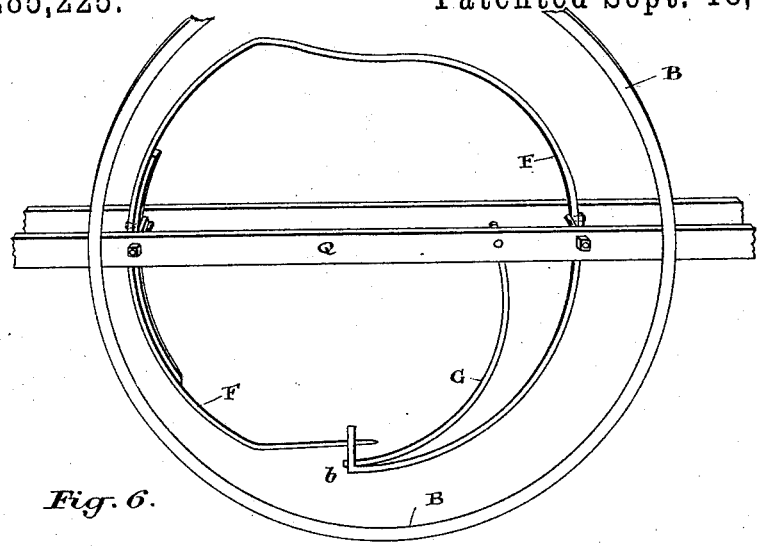
Fig. 6.
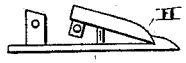
Fig. 7.
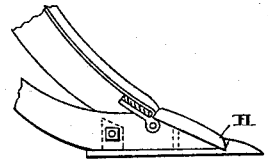
Fig. 8.
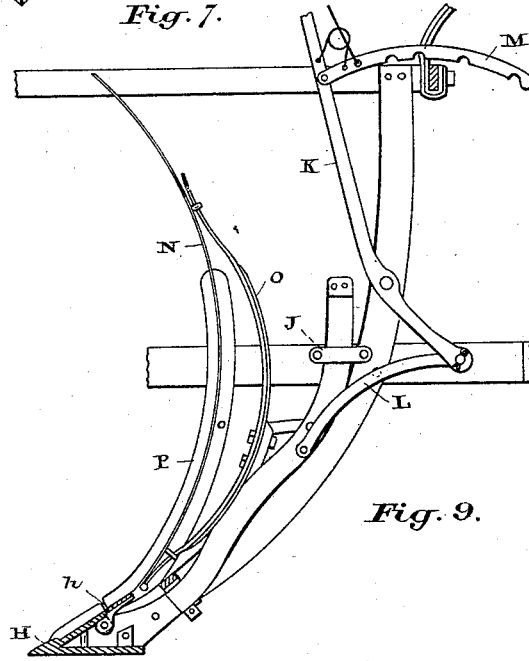
Fig. 9.
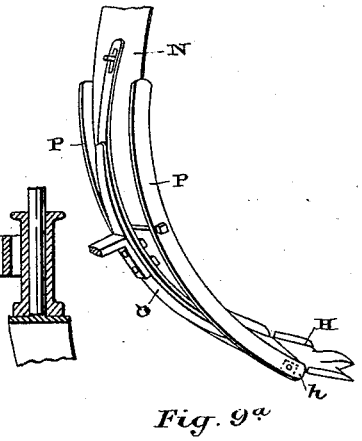
Fig. 9ᵃ.
Witnesses.
Lewis Tomlinson
F. B. Fetherstonhaugh
Inventors.
Henry Carter
Wm Rennie
by Donald C. Ridout & Co.
Attorneys.

(No Model.)  5 Sheets—Sheet 4.
H. CARTER & W. RENNIE.
DITCHING MACHINE.
No. 285,225. Patented Sept. 18, 1883.
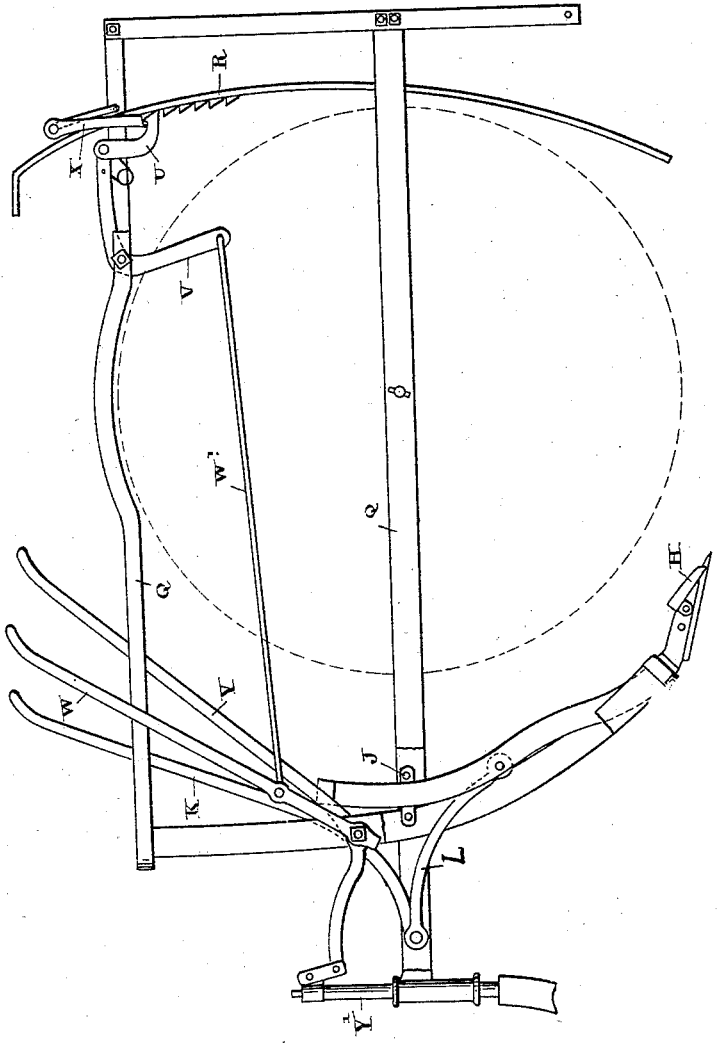
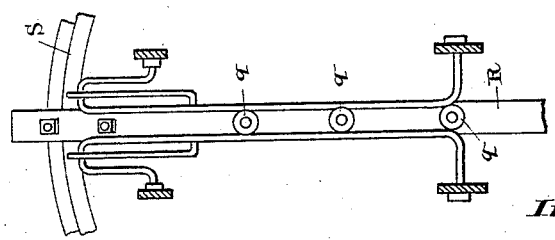

(No Model.) 5 Sheets—Sheet 5.
H. CARTER & W. RENNIE.
DITCHING MACHINE.
No. 285,225. Patented Sept. 18, 1883.
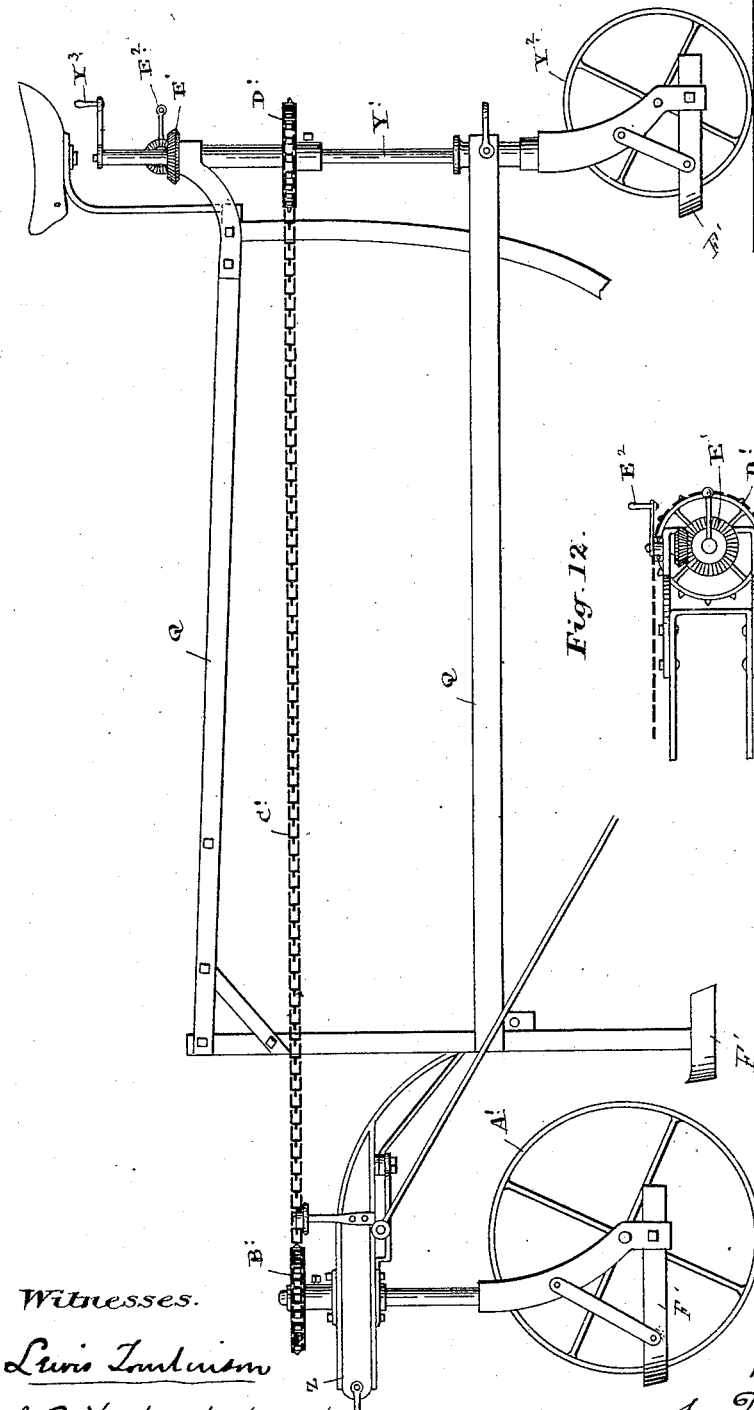
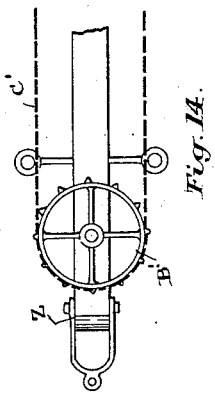
Witnesses.
Lewis Toulmin
J. B. Fetherstonhaugh
Inventors.
Henry Carter
Wm Rennie
by Donald C. Ridout & Co.
Attorneys.

UNITED STATES PATENT OFFICE.

HENRY CARTER AND WILLIAM RENNIE, OF TORONTO, ONTARIO, CANADA; SAID CARTER ASSIGNOR TO SAID RENNIE.

DITCHING-MACHINE.

SPECIFICATION forming part of Letters Patent No. 285,225, dated September 18, 1883.

Application filed April 12, 1883. (No model.)

*To all whom it may concern:*

Be it known that we, HENRY CARTER and WILLIAM RENNIE, both subjects of the Queen of Great Britain, residing at the city of Toronto, in the county of York, in the Province of Ontario, Dominion of Canada, have jointly invented certain new and useful Improvements in Ditching-Machines, of which the following is a specification.

Our invention relates to certain improvements in a ditching-machine patented by us in the United States under Letters Patent No. 238,647; and the object of the invention is to improve the operation of the said ditching-machine, the novelty consisting in the construction and arrangement of parts, as will be more fully hereinafter set forth, and specifically pointed out in the claims.

Figure 1:
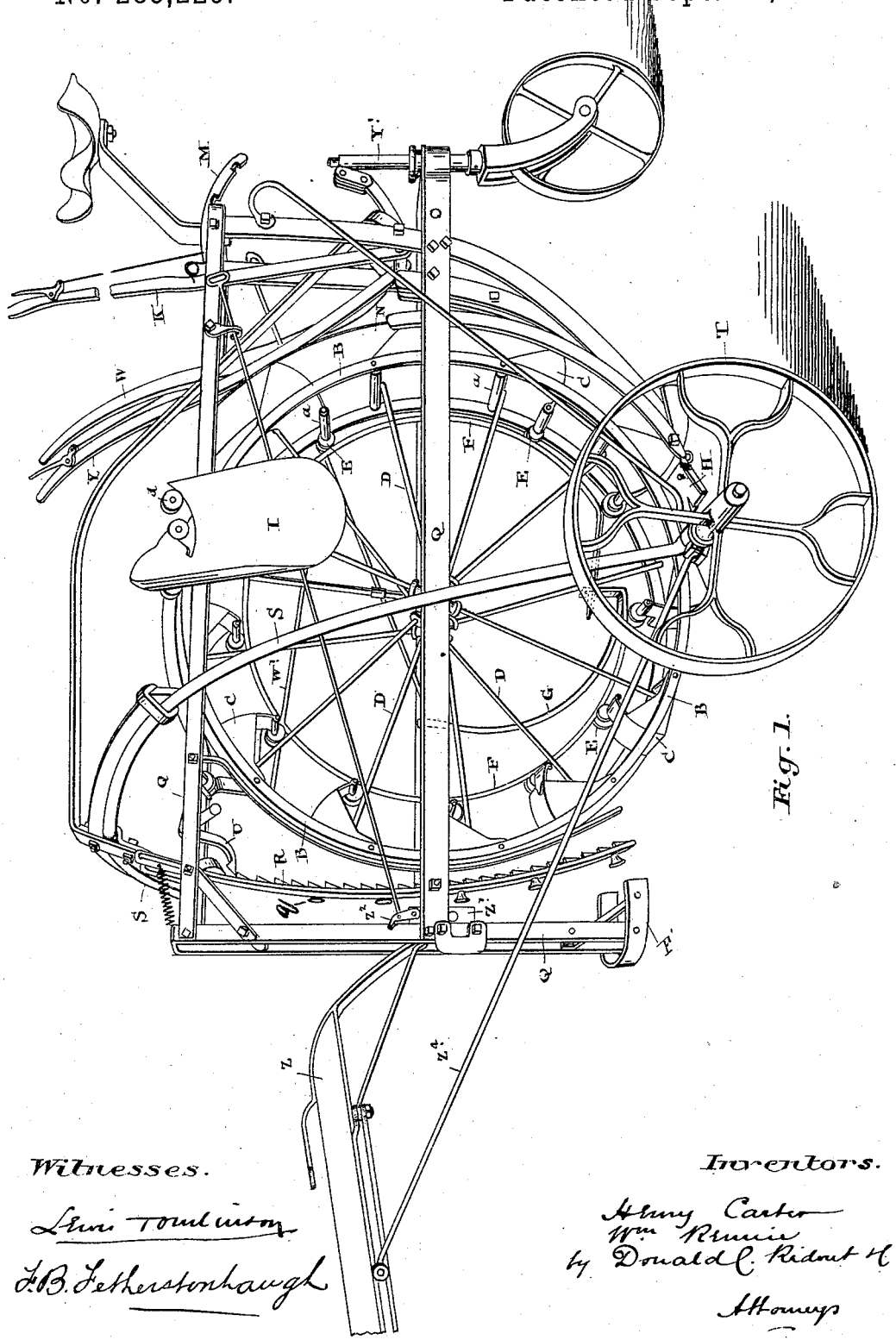
Figure 2:
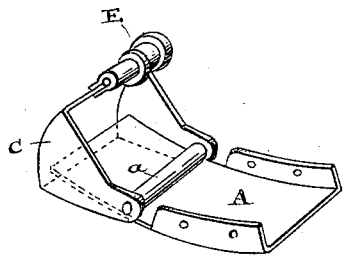
Figure 3:
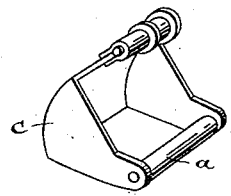
Figure 4:
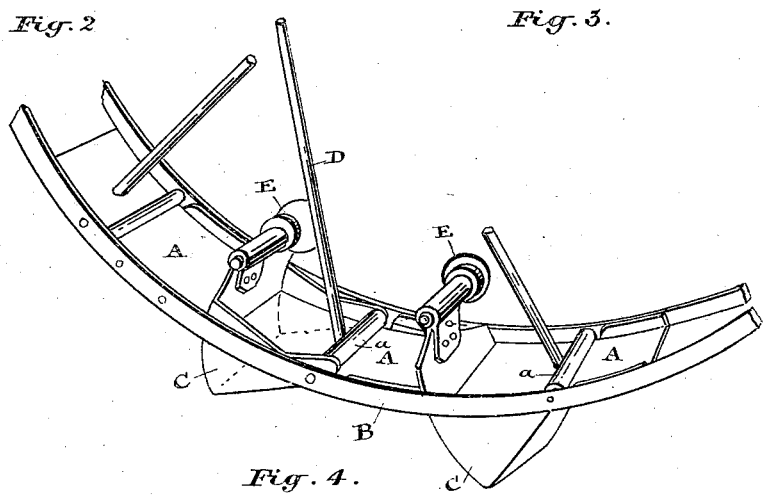
Figure 5:
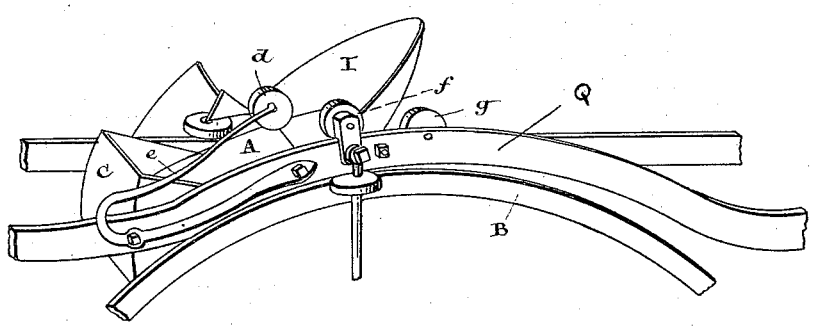

In the drawings, Figure 1 is a perspective view of the whole machine. Fig. 2 is a perspective detail of one of the plates forming the bottom of the elevating-bucket, and also the rim of the elevating-wheel. Fig. 3 is a perspective detail of the body-piece of the bucket. Fig. 4 is a perspective detail, showing two of the buckets in position between the rings employed in binding the plates together. Fig. 5 is a perspective detail of that portion of the machine where the elevating-buckets empty into the discharging-spout. Fig. 6 is a detail showing the cam-bar. Fig. 7 is a detail of the nose of the spade. Fig. 8 is a detail showing the manner of hinging the nose of the spade to its body. Fig. 9 is a detail of the spade and its connections. Fig. 9ª is a perspective back view of the spade. Fig. 10 is a skeleton detail, showing the arrangement of the levers for operating the machine. Fig. 11 is a front view of the front frame of the machine. Fig. 12 shows the frame of the machine and steering apparatus when adapted for steam-power. Fig. 13 is a detail showing a plan of the gearing for steering the guiding-wheel. Fig. 14 is a plan of the front frame of the machine when adapted for steam-power.

In the drawings like letters of reference indicate corresponding parts in each figure.

As our invention relates to improvements in the construction of the ditching-machine already described in our Patent No. 238,647, it is not necessary in this specification to describe fully the entire construction and operation of the machine, as it is only in the details which we shall specifically mention that the present machine differs from the machine described in the patent referred to.

The first improvement we shall proceed to describe is the particular construction of the elevating-wheel. This is shown fully in Fig. 1 and in the detail Figs. 2, 3, and 4. The rim of the wheel is composed of a series of plates, A, flanged as shown in Fig. 2, and riveted, as represented in Fig. 4, to two metal rings, B, the plates A being riveted between these rings sufficiently far apart to permit the back of the bucket-body piece C to slip between them. It will also be seen, on reference to Fig. 2, that these plates A are narrower where they are not flanged, the reduction in the width being made for the purpose of permitting the sides of the body-piece C to work between the plate and the rings, binding them together, the body C being, as represented, pivoted to the metal rings B, a ferrule, *a*, being placed between the sides of the body-piece at the pivot point, as represented. It will thus be seen that the plates A, bound rigidly together by the metal rings B, form a segmental rim or tire to the wheel, and also constitute a bottom to the bucket, formed by the body-piece C projecting beyond the periphery of the wheel. The rim of the wheel thus formed is securely braced to its hub by the spokes D.

E is a friction-roller journaled in a bracket riveted to the body-piece C. This roller is designed to rest upon the cam-bar F, which is shaped substantially as shown in Fig. 6, in order to force the body-piece C outside the periphery of the wheel at the point where it is desired to make the elevating-bucket, and is likewise shaped to permit the body-piece of the bucket to be pushed in flush with the periphery of the wheel at the point where it discharges the earth it has elevated.

It will be noticed, on reference to Fig. 6, that the cam-bar F has a joint formed in it at *b*. The cam-bar, on one side of this joint, is provided with a spring, G, forming thereby a spring cam-bar to force the body-piece of each bucket as it approaches the ground out beyond the periphery of the wheel, in order to constitute a grip to prevent the wheel slipping. As the wheel continues to revolve the friction-roller E passes the point $b$. At this point the bucket should commence to gather the earth which has been loosened by the spade H, the advantage of the joint being that should the bucket come in contact with any obstruction which might otherwise injure it the joint permits the cam-bar to spring back, allowing the body-piece C to recede sufficiently to clear the obstruction. As the wheel continues to revolve each bucket proceeds to gather its load of earth, which it raises to the top of the wheel, where a discharge-spout, I, is fixed, as shown. As it is necessary that the body-piece C should recede within the periphery of the wheel at this point, and at the same time do so only gradually, I provide three friction-rollers, the friction-roller $d$ being journaled on the end of a spring-bar, $e$. The roller $g$ is journaled on a spindle fixed to the frame of the machine. $f$ designates a roller intermediate between the rollers $d$ and $g$. As each bucket approaches the discharge-spout the body-piece C first comes in contact with the roller $d$. This roller forces the body-piece inwardly. It next comes in contact with the roller $f$, which pushes it still farther in, and finally the roller $g$ completes the desired operation. The body-pieces C revolving with the wheel, after passing the roller $g$ project within the periphery, instead of beyond it, until it has reached the point where it is desired to force it outwardly in order to constitute a grip on the ground to prevent the wheel slipping.

On reference to Figs. 9 and 10 the manner of securing the spade or plow H to the frame of the machine will be understood. It will be noticed in these figures that the shank of the spade H is curved, and is held in bearings J, fixed to the frame of the machine in such a manner that when the spade is raised or lowered it at all times will follow the circle of the elevating-wheel. It therefore follows that the nose of the spade will always be at the same distance from the buckets, no matter at what elevation the spade may be set.

With the view of enabling the driver to readily adjust this spade, we provide a hand-lever, K. This lever is pivoted to the frame of the machine, and is connected to the spade H by the link L. (See Figs. 9 and 10.) A notched bar, M, is pivoted to the lever K, and is arranged to engage with some fixed point in the main frame of the machine. It will thus be seen that the driver, by adjusting the angle of the lever K, can raise or lower the spade as required and hold it in any desired position.

In order to form a back for the buckets while elevating the earth from the nose of the plow to the point of discharge, we provide a steel back plate, N, hinged at $n$ to the nose of the plow, and extending from that point around the wheel, as shown, the said plate being held so that it will move with the spade. A spring, O, is provided, as shown, for the purpose of stiffening the plate N, but at the same time permit it to spring should anything being elevated by the buckets be larger than the space allowed for its passage. The flanges P are fixed to the back plate, N, as shown, so that they can readily be removed when the machine is to be used in sticky ground.

Figs. 10 and 11 show skeleton views of the mechanism for raising the frame of the machine.

Q is the main frame of the machine, upon which the elevating-wheel is journaled.

R is a notched bar attached to the steadying-frame S, which steadying-frame, as shown in Fig. 1, is supported by the ground-wheels T.

U is a pawl arranged to engage with the notches on the bar R. (See Fig. 10.) This pawl U is connected to a crank, V, pivoted to the frame Q, and connected by the rod W' to the hand-lever W, which is pivoted on the rear of the frame Q, near the driver's seat. By drawing upon the hand-lever W the pawl U is fulcrumed on the notched bar R, which being connected to the steadying-frame S, carried on the ground-wheels T, causes the said ground-wheels to carry the weight of the machine.

On reference to Fig. 10 it will be seen that the stop-bar X fits into a notch made above the notch into which the pawl U is entered. Thus when the movement of the lever W, which should be sufficient to raise the machine several notches, forces the main frame Q to mount onto the bar R, the stop-bar X falls into engagement several notches above its former position, and thereby holds the steadying-frame in position while the lever is thrown forward, so as to enable the pawl U to fit into one of the notches above the notch into which it has recently been fulcrumed; but such pawl should not be raised far enough to dislodge the stop-bar X. It will thus be seen that the driver, by moving the hand-lever W backward and forward, can raise the front of the machine to any desire altitude.

With the view of permitting the free movement of the bar R in the frame Q, we provide the friction-roller $q$, (see Figs. 1 and 11,) which friction-rollers, by coming in contact with the frame Q, prevent the bar binding. The hand-lever Y, pivoted on the frame Q, is suitably connected, as shown, to the spindle Y' of the caster-wheel. This lever is adapted to enable the driver to raise the rear end of the machine on the caster-wheel.

When it is desired to drop the elevating-wheel into a ditch, the stop-bar X is thrown out of the notch by the action of the pawl U, which, as will be seen on reference to Fig. 10, may be caused to come in contact with the end of the bar X by raising to a further extent than when raising the machine, thereby forcing it out of the notch into which it may at the time be fitting. The connection between the steadying-frame and main frame being thereby broken, the main frame, which carries the elevating-wheel, will of course drop.

On reference to Fig. 1 it will be seen that the tongue Z is pivoted upon a block, Z', held in the front end of the frame Q. This block Z' has a pawl, Z², pivoted upon it, and designed to fit into a notch formed in the front bar of the frame Q for the purpose of holding the block Z' in the position indicated in Fig. 1.

When the front of the frame Q is lowered, and it is desired to raise the inner end of the tongue Z, the pawl Z² is drawn out of its notch by the rod Z³, thereby permitting the block Z' to move upwardly.

Although the drawings exhibit only one ground-wheel T, it is of course understood that there are two such wheels, as shown in our original patent, hereinbefore referred to. In that patent the ground-wheels are braced only to the rear of the machine; but as it is found in practice that the machine could not be easily turned when so braced, we have in our present invention provided the additional stay-rods Z⁴, extending from the ground-wheels T to the tongue Z, to which they are connected by a pin designed to work in a horizontal slot formed in the bottom of the tongue. This slot permits the free movement of the steadying-frame, and also of the tongue, notwithstanding the stay-rods Z⁴, which, if they were fixed rigidly to the tongue, would prevent the movement of either the steadying-frame or the tongue.

So far we have described the machine as constructed for horses to draw; but as it is intended that the machine should be used for steam-power as well, we show in Figs. 12, 13, and 14 the necessary alterations for enabling the machine to be so used.

As the only alterations in the machine are those necessary to adapt it for this particular purpose, we have not shown in the views we are now about to describe any portion of the machine except that immediately connected with the alterations.

Instead of arranging the tongue Z for horses, we provide a caster-wheel, A⁷, supported in a suitable journal formed on the tongue Z, as shown. On the top of this caster-wheel spindle we fix a sprocket-wheel, B', which sprocket-wheel is connected by the chain C' to a sprocket-wheel, D', keyed to a sleeve journaled on the spindle Y' of the caster-wheel. This sleeve extends through a journal formed on the frame Q, and has keyed on its top end a beveled pinion, E', arranged to engage with a similar pinion keyed to a horizontal spindle having a crank-handle, E², as clearly shown in Fig. 12. Thus it will be seen that by turning the crank-handle E² the front caster-wheel, A², may be turned with the view of guiding the machine when it is being drawn forward. When it is being drawn backward, the caster-wheel A' is of course not used for steering, the rear caster-wheel, Y², being then operated by the handle Y³.

In order to guide the machine, and at the same time keep the sides of the elevating-wheel clear of the sides of the ditch, we provide what may be termed "landsides" F', which, when the machine is built for horses, are placed, as shown in Fig. 1, on the bottom of the main frame Q. These landsides are formed by a bar bent around this frame, and are a little wider than the elevating-wheel.

When the machine is built for steam-power, as shown in Fig. 12, the landsides are formed on the spindle of the caster-wheel, extending around the front of the caster-wheel, and are also of a width a little greater than the width of the elevating-wheel. It will be seen that the landsides are situated slightly above the level of the bottom of the wheel. This is in order that they may not come in contact with the ground until the ditch has first been formed, after which they form an absolute guide for keeping the machine in the ditch, therefore relieving the operator of any trouble in attending to the guiding of the machine.

As the operation of pulling the machine by steam-power is the same as that employed for driving steam-plows, we have not described this operation; but we may here mention that the seat G' is made reversible when the machine is constructed for steam-power, so that the operator can turn the seat so as to face in the direction the machine is at the time moving.

What we claim as our invention is—

1. In an elevating-wheel of a ditching-machine having a segmental rim composed of plates separated from each other, but bound rigidly together by two metal rings secured to and on either side of the said plates, the combination of body-pieces hinged to and between the metal rings, so as to form with the plates a series of discharging earth-buckets, substantially as and for the purpose specified.

2. In a ditching-machine in which the body-piece of each earth-elevating bucket is hinged between rings forming sides to the tire or rim of the wheel, and in combination with said parts, a series of plates forming the bottom of the buckets, and also the segmental rim of the wheel, each plate being flanged behind the pivot-point of the buckets, while that portion of it which forms the bottom of the bucket is unflanged, and is of such a width that the body-piece can work freely between it and the rings to which the plates are riveted.

3. In a ditching-machine in which the earth is elevated by a series of buckets arranged round the periphery of a wheel, each bucket being composed of a stationary bottom and a hinged body-piece, as described, the combination of a series of rollers located at the discharging-spout of the elevating-wheel, so that the body of the buckets will come in contact with them in quick succession, so as to be gradually pushed back clear of the outer rim, substantially as and for the purpose specified.

4. In a ditching-machine in which the body-piece of each elevating-bucket is hinged, as described, and is provided with a friction-roller, as specified, the combination, with such parts, of a spring cam-bar so shaped and arranged that the body-piece of each bucket as it approaches the ground is forced out beyond the periphery of the wheel in order to constitute a grip to prevent the wheel slipping, substantially as and for the purpose specified.

5. In a ditching-machine in which the body-pieces of the elevating-buckets are thrown in and out, as required, by a cam-bar, a joint formed in the said cam-bar, near the point where the buckets commence to raise the material, in combination with a spring arranged to act on the said cam-bar near the said joint, so that while forcing the body-piece out to form elevating-buckets they will "give" should they come in contact with an obstruction.

6. In a ditching-machine in which the earth is elevated by a series of buckets formed on the periphery of a wheel, a curved plate held in position by a spring, so as to form a back to the buckets while elevating the earth, with sides detachably fixed to the plate, so that they can be readily removed when the machine is to be worked in sticky ground, all combined and operating as set forth.

7. In a ditching-machine in which the weight of the machine is carried by the earth-elevating wheel journaled in a frame adjustably connected to a steadying-frame supported by two wheels, one on each side of the machine, the combination, with such parts, of a stay-rod fastened to the axle of each wheel and extending obliquely to the tongue of the machine, and connected thereto in such a manner that their connecting point or points move longitudinally on the said tongue to permit the free vertical movement of either the steadying frame or the tongue, substantially as and for the purpose specified.

Toronto, December 30, 1882.

HENRY CARTER.
WM. RENNIE.

In presence of—
   CHAS. C. BALDWIN,
   F. BARNARD FETHERSTONHAUGH.